Patented July 4, 1950

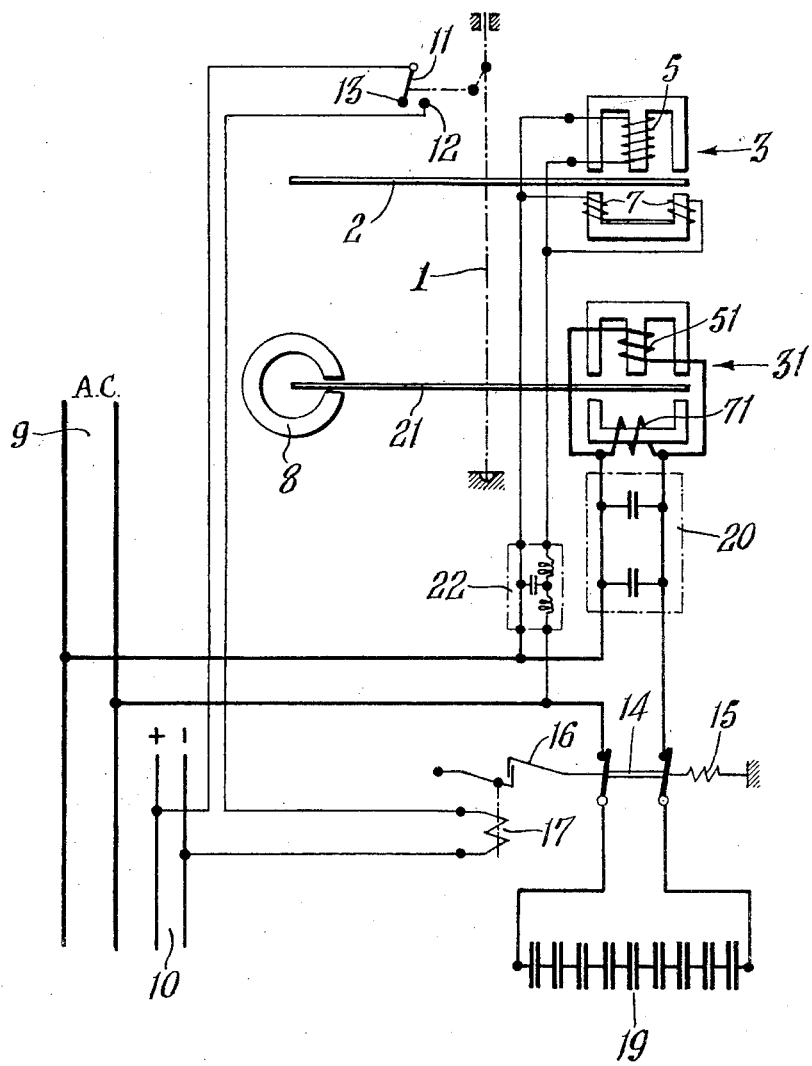

2,513,957

UNITED STATES PATENT OFFICE 2,513,957

PROTECTIVE SYSTEM FOR CONDENSERS

Georges Ogurkowski, Zug, Switzerland, assignor to Landis & Gyr, A. G., a body corporate of Switzerland Application June 28, 1946, Serial No. 679,985
In Switzerland June 26, 1945

5 Claims. (Cl. 175—294)

The present invention relates to protective devices for batteries of condensers.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The single figure of the drawing shows schematically a typical and preferred embodiment of the invention.

The present invention has for its object the provision of a novel and improved automatic protective relay for preventing damage to batteries of condensers, such as may be used for phase angle correction. A further object of the invention is the provision of a protective device which will not be subject to faulty operation and will operate properly even under changing line conditions.

Batteries of condensers are often used as a protection against surges at the terminals of overhead lines or arranged between side lines and the machines to be protected. Such batteries are also used for improving the phase angle, and are connected to high- and low-tension circuits on the consumers' premises.

It has been the custom to protect these batteries by means of over-voltage releases, or also, in the case of large plants, to use the well-known overload relays, with or without a transformer release. In special cases, condenser elements, connected in series have been protected by individual protective devices.

Such protective devices have certain defects, in that they afford no protection against internal faults of the condenser battery. For example, in a battery composed of 20 or more elements, connected in series, one of them may become useless owing to internal short-circuiting. In such event, however, the battery, as a whole, is not useless: the capacity, and with it the current, of the condenser increase in only small degrees, according to the number of faulty elements.

Owing to voltage fluctuations—which may amount to plus 10% and more—the adjustment of the excess current protective device must be effected in such a manner that it is not released, even at maximum voltage, by the surge of current when switching-on. For these reasons the protective device is usually adjusted so that the release does not occur until the over-current is 1.5–2 times the standard or rated value. It is easily seen that, in a condenser battery in which 10–20 elements are connected in series, the overcurrent set up by an internal defect in one element is too small to cause the protective device to respond.

According to the invention, these drawbacks are removed by means of a relay consisting of two oppositely connected, relatively fixed rotary systems, which responds essentially to the change in the resistance to alternating currents of the condenser battery connected to the circuit at the output end of the line, in such a manner that, when a certain variable minimum value of the said resistance is exceeded, the rotary system begins to rotate in one direction, and after a period depending on the magnitude of the said resistance, closes a contactor, whereas, when the values of the said resistance exceed the set minimum value, a torque is set up in the opposite direction, thereby opening the contactor and pressing the movable contact member against a fixed stop.

Relays, which respond at a definite relation between voltage and current, are known per se. They serve chiefly as protective devices for overhead conductors and networks, and are characterized in that the time of their release depends on the impedance of the protected overhead conductor, that is to say, the time of release of the relay is greater in proportion as the short-circuit is further away from the point where the protective relay is connected.

The aforesaid property of responding to the impedance of a condenser battery connected to the output end of the line, is obtained, for example, in that the torques of a $I^2$ magnet system and a $E^2$ magnet system are connected mechanically in opposition to one another. In such case, the conditions in neutral position are expressed by $$K_1 I^2 - K_2 E^2 = 0$$

or $$\frac{E}{I} = Z = \sqrt{\frac{K_1}{K_2}} = \text{a constant}$$

In these formulae: $I$ denotes the current in the $I^2$ magnet system; $E$ the voltage in the $E^2$ magnet system; $K_1$, $K_2$ constants in the $I^2$ and $E^2$ systems respectively: and Z the impedance of the condenser battery connected to the output end of the line.

For a given value of Z—for example $Z_0$—there is equilibrium, that is to say, the torques of the two magnet systems are of equal value. If the current is smaller—that is the impedance greater—than $Z_0$, the torque of the $E^2$ system will predominate and turn the armature backward, so as to bear against a fixed stop. If the current becomes greater (for example in the case of internal short-circuiting), Z will be lower and the torque of the $I^2$ system will predominate. Consequently, the disc armature will begin to turn in the forward direction and effect, by a contact, the release of the switch of the battery to be protected. The impedance at which equilibrium occurs—the so-called response impedance—can be made adjustable by any suitable means. For the practical solution of the problem, a Ferraris system can be advantageously used as the rotary system. Other systems, however, are possible, in which the torque is proportional to $I^2$ and $E^2$ respectively, according to the winding used.

It will be understood that the foregoing general description and the following detailed description as well are exemplary and explanatory of the invention but are not restrictive thereof.

In the present illustrative embodiment of the invention, the relay includes a spindle 1 running in top and bottom bearings and carrying two discs 2, 2' forming the rotary system. An $E^2$ magnet system 3 acts on the disc 2, whilst a $I^2$ magnet system 3' acts on the disc 2'. Voltage and current coils 5, 7 and 5', 7' respectively serve to generate phase-displaced driving fluxes. The time of release can be set by means of a damping magnet 8, which preferably acts on the lower driving disc 2'. The $E^2$ magnet system 3 is now connected in parallel with an alternating current supply net work 9 and generates a clockwise directed torque acting on the disc 2. Similarly the $I^2$ magnet system, which is connected in series with the condenser battery 19, generates a torque which acts in the counter-clockwise direction on the axis 1 and accordingly opposes the torque of the $E^2$ magnet system. The alternating current network 9 feeds—through a switch 14—the condenser battery 19 consisting of a large number of condenser elements 19 connected in series.

A contact arm 11 is actuated from the spindle 1 through transmission mechanism shown only diagrammatically in the drawing. When the clockwise torque predominates, this contact arm bears against a stop 13 and the release circuit—connected with an auxiliary source of potential 10—of a release relay 17 is opened, so that a catch 16 keeps the switch 14 closed against the pull of a spring 15. If, on the contrary, the $I^2$ magnet system operates effectively in the anti-clockwise direction, the contact arm 11 acting through a contact 12, closes the release-current circuit of the release relay 17 and releases the switch 14.

The magnet systems 3' and 3 are preferably protected from higher harmonics by low pass filters 20, 22 respectively.

Normally the switch 14 is closed, and the condenser battery 19 which here serves for phase improvement, takes over the wattless load of the network. The protective relay is then so adjusted that the torques of the two systems are just balanced, or that the $E^2$ magnet system slightly predominates, so that the contact arm 11 is normally pressed against the stop 13.

In the event of trouble, i. e. short-circuiting of one or more elements of the condenser, a change of impedance results, the relay begins to turn in the anti-clockwise direction, since in such case, the torque of the $I^2$ magnet system predominates. After the lapse of a predetermined time, the length of which depends on the extent of the internal fault, the switch arm 11 closes the circuit of the relay 17 at the contact 12, thereby releasing the switch 14 in the described manner.

If, however, there is a considerable increase of voltage in the network, the increase of current in the $I^2$ magnet system is accompanied by a similar increase in the $E^2$ magnet system, the torques are also increased to the same extent and the relay continues at rest.

The protective device of the present invention has the great advantage of being independent of voltage, that is to say, the relay can be so precisely adjusted that the device operates on the occurrence of even the slightest internal defect, whilst the voltage of the condenser battery can fluctuate considerably without releasing the protective device. The device likewise is only slightly dependent on frequency (in respect of the relay). In both systems, the torque is in approximately direct proportion to the frequency $f$. The resultant increases or decreases in torque therefor counterbalance one another. Certainly a change of frequency is accompanied by a change in the impedance of the condenser battery, in which it may be mistaken for an internal fault. However, changes in frequency are generally so slight that adjustment of the relay to that amount is superfluous.

A further advantage is the low cost of production, since all the parts may be those manufactured for standard electricity meters.

By altering the constants $K_1$, $K_2$, the impedance value of the protective relay can be adjusted. This possibility of adjustment can be obtained by adapting the torque in the $I^2$ magnet system to the existing conditions by varying the flux, for example, by varying the width of the air gap. The same result can be obtained by means of tappings on the driving coils. On the other hand, the angle between the two driving flues of one rotary system can also be altered, either alone or in conjunction with the two aforesaid expedients. The phase angle can be modified, for example by altering the magnetic shunt at one of the driving fluxes or by the interpolating of inductances, capacities or resistances in a suitable known manner.

A change in the time of release of the protective relay can be easily effected by simply adjusting the brake magnet 8, since the speed of rotation of the rotary system can be influenced thereby.

An analogous action to that of the above described protective relay can obviously be also obtained with a relay of similar design, the torques of which are in the relative proportions $I^2$ and $EI \sin \phi$. Such relays result from the application of known connections to the relays above described. The considerations already mentioned apply in a similar manner to this case also.

The invention in its broader aspects is not limited to the specific mechanisms shown and described but departures may be made therefrom within the scope of the accompanying claims without departing from the principles of the invention and without sacrificing its chief advantages.

What is claimed is:

1. A device for protecting condenser batteries against short circuiting including in combination a pair of interconnected rotary means each provided with electro-magnetic driving means supplied with power from the circuit to which the condensers are connected, one of said driving means being connected in parallel to the protected condensers and responsive to changes in line voltage, the other driving means being connected in series with the protected condensers and responsive to the current drawn by the condensers, said driving means being connected to oppose each other whereby the rotary means rotates in one direction only when the current drawn by the condensers is increased without a corresponding increase in voltage, and means controlled by said rotary means for disconnecting the condensers from the line when an abnormal increase in current drawn by the condensers occurs.

2. A protective device according to claim 1 in which the driving means each comprises a Ferraris motor.

3. A protective device according to claim 1 in which the condensers are connected to the line through a relay and the relay is actuated by a contact closed by rotation of the rotary means.

4. A protective device according to claim 1 in which the electromagnetic driving means are protected by low pass filters to prevent actuation by harmonics.

5. A protective device according to claim 1 in which one of the rotary means is a disc cooperating with a brake magnet to damp its rotation.

GEORGES OGURKOWSKI.

REFERENCES CITED

The following references are of record in the file of this patent:

UNITED STATES PATENTS

| Number | Name | Date |
| --- | --- | --- |
| 717,497 | Cuenod | Dec. 30, 1902 |
| 1,483,552 | Pickard | Feb. 12, 1924 |
| 1,724,390 | Bauch et al. | Aug. 13, 1929 |
| 1,738,344 | Anderson | Dec. 3, 1929 |
| 1,900,495 | Gay | Mar. 7, 1933 |
| 1,925,469 | Stoecklin | Sept. 5, 1933 |
| 1,946,299 | Traver | Feb. 6, 1934 |
| 2,078,667 | Kado | Apr. 27, 1937 |
| 2,099,568 | Metzger | Nov. 16, 1937 |
| 2,399,367 | Marbury | Apr. 30, 1946 |